United States Patent
Sato et al.

(10) Patent No.: US 7,967,063 B2
(45) Date of Patent: Jun. 28, 2011

(54) AIR CONDITIONING APPARATUS FOR VEHICLE

(75) Inventors: Hiroyuki Sato, Obu (JP); Toshihiko Muraki, Kariya (JP)

(73) Assignee: Denso Corporation, Kariya (JP)

( * ) Notice: Subject to any disclaimer, the term of this patent is extended or adjusted under 35 U.S.C. 154(b) by 590 days.

(21) Appl. No.: 12/217,034

(22) Filed: Jul. 1, 2008

(65) Prior Publication Data

US 2009/0013706 A1   Jan. 15, 2009

(30) Foreign Application Priority Data

Jul. 10, 2007   (JP) ................................. 2007-181417

(51) Int. Cl.
*F25B 29/00*   (2006.01)

(52) U.S. Cl. ............ 165/202; 165/42; 165/43; 165/103; 236/13; 237/12.3 A; 237/12.3 B; 454/156; 454/160; 454/161; 454/325; 454/327; 454/335; 454/318; 454/319; 137/630.14; 137/630.15; 137/630.22

(58) Field of Classification Search .................. 165/202, 165/42, 43, 103; 236/13; 237/12.3 A, 12.3 B; 454/156, 160, 161, 325, 327, 335, 318, 319; 137/630.14, 630.15, 630.22
See application file for complete search history.

(56) References Cited

U.S. PATENT DOCUMENTS

| | | | | |
|---|---|---|---|---|
| 2,135,810 A * | 11/1938 | Germonprez | ................. | 454/318 |
| 2,220,520 A * | 11/1940 | Hein | ............................. | 454/319 |
| 4,259,987 A * | 4/1981 | Janssen | .......................... | 454/335 |
| 4,383,642 A * | 5/1983 | Sumikawa et al. | ...... | 237/12.3 A |
| 4,518,012 A * | 5/1985 | O'Hara | .......................... | 454/319 |
| 4,534,507 A * | 8/1985 | Matsuda | .................. | 237/12.3 A |
| 5,220,944 A * | 6/1993 | Burnett et al. | ........... | 137/630.14 |
| 5,853,323 A * | 12/1998 | Beck et al. | ..................... | 454/156 |
| 5,878,806 A | 3/1999 | Denk et al. | | |
| 6,189,801 B1 * | 2/2001 | Klingler et al. | .......... | 237/12.3 B |
| 6,254,475 B1 * | 7/2001 | Danieau et al. | ............... | 454/156 |
| 6,607,029 B2 * | 8/2003 | Danieau | .......................... | 165/42 |
| 6,761,210 B1 * | 7/2004 | Arold | .............................. | 165/43 |
| 6,823,935 B1 * | 11/2004 | Arold | ............................ | 165/202 |

FOREIGN PATENT DOCUMENTS

| | | |
|---|---|---|
| DE | 44 42 000 | 5/1996 |
| JP | 60-110119 | 7/1985 |
| JP | 9-175148 | 7/1987 |

OTHER PUBLICATIONS

Office action dated Apr. 13, 2009 in Japanese Application No. 2007-181417.

* cited by examiner

*Primary Examiner* — John K Ford
(74) *Attorney, Agent, or Firm* — Harness, Dickey & Pierce, PLC

(57) ABSTRACT

An air conditioning apparatus has a cool-side door device and a heating-side door device between an evaporator and a heater core. The cool-side door device is configured to open and close a cool air passage through which a cool air generated by the evaporator flows. The heating-side door device is configured to open and close a heating air passage through which the cool air flows to be heated by the heater core. At least one of the cool-side door device and the heating-side door device is constructed of a plurality of doors. The plurality of doors is configured to begin to open successively when being opened from a fully closed condition.

6 Claims, 2 Drawing Sheets

[MAX. HOT]

(MAX. COOL)

AIR CONDITIONING APPARATUS FOR VEHICLE

CROSS REFERENCE TO RELATED APPLICATION

This application is based on Japanese Patent Application No. 2007-181417 filed on Jul. 10, 2007, the disclosure of which is incorporated herein by reference.

FIELD OF THE INVENTION

The present invention relates to an air conditioning apparatus for a vehicle.

BACKGROUND OF THE INVENTION

In general, an air conditioning unit of a vehicle air conditioning apparatus has a case defining an air passage therein, an evaporator for generating cool air, and a heater core for heating the cool air. The heater core is arranged in the case such that a cool air passage, that is, a bypass passage through which the cool air flows while bypassing the heater core is provided in the case. The air conditioning unit further includes an air mix door disposed upstream of the heater core with respect to an air flow. The air mix door is movable between a maximum heating position in which a heating air passage communicating with the heater core is fully open and the bypass passage is fully closed and a maximum cooling position in which the heating air passage is fully closed and the bypass passage is fully open. That is, the air mix door is configured to control a ratio of the volume of the air passing through the heater core to the volume of the cool air passing through the bypass passage, thereby to control a temperature of air introduced in a passenger compartment of a vehicle.

In such an air conditioning unit, passage resistance of the bypass passage is smaller than that of the heating air passage because the heater core is not provided in the bypass passage. Therefore, when the air mix door is slightly moved from the maximum heating position to a position at which the bypass passage is slightly opened, the cool air tends to largely flow into the bypass passage. As a result, the temperature of air introduced in the passenger compartment is likely to be rapidly reduced.

For example, U.S. Pat. No. 5,878,806 describes an air conditioning apparatus having multiple air mix doors. The air mix doors are disposed in each of a bypass passage and a heating air passage that is in communication with the heater core, respectively. The multiple air mix doors are operated simultaneously in a frame.

SUMMARY OF THE INVENTION

According to an aspect of the present invention, an air conditioning apparatus for a vehicle includes a case, an evaporator, and a heater core. The evaporator is disposed in the case for generating a cool air. A cool air passage is provided in the case downstream of the evaporator. A heating air passage is provided in the case downstream of the evaporator. The heater core is disposed in the heating air passage for heating the cool air. An air mixing space is provided in the case downstream of the cool air passage and the heating air passage. The air conditioning apparatus further includes a cool-side door device disposed upstream of the cool air passage for controlling a volume of the cool air flowing in the cool air passage and a heating-side door device disposed upstream of the heating air passage for controlling a volume of the cool air flowing in the heating air passage. At least one of the cool-side door device and the heating-side door device includes a plurality of doors. The plurality of doors is configured to begin to open successively.

In a case where the cool-side door device includes the plurality of doors, when the cool air passage is opened from the fully closed condition, the plurality of doors begins to open successively. Therefore, the volume of the cool air flowing in the cool air passage is controlled. As such, it is less likely that a large amount of the cool air will flow in the cool air passage and a temperature of air blown into a passenger compartment will be reduced rapidly.

In a case where the heating-side door device includes the plurality of doors, when the heating air passage is opened from the fully closed condition, the plurality of doors begins to open successively. Therefore, the volume of the cool air flowing in the heating air passage is controlled. As such, it is less likely that a large amount of the cool air will flow in the heating air passage to be heated by the heater core and a temperature of air blown into the passenger compartment will be increased rapidly.

Accordingly, the temperature of the air blown into the passenger compartment can be controlled generally linearly with respect to the positions of the cool-side door device and the heating-side door device.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENT

Figure 1:
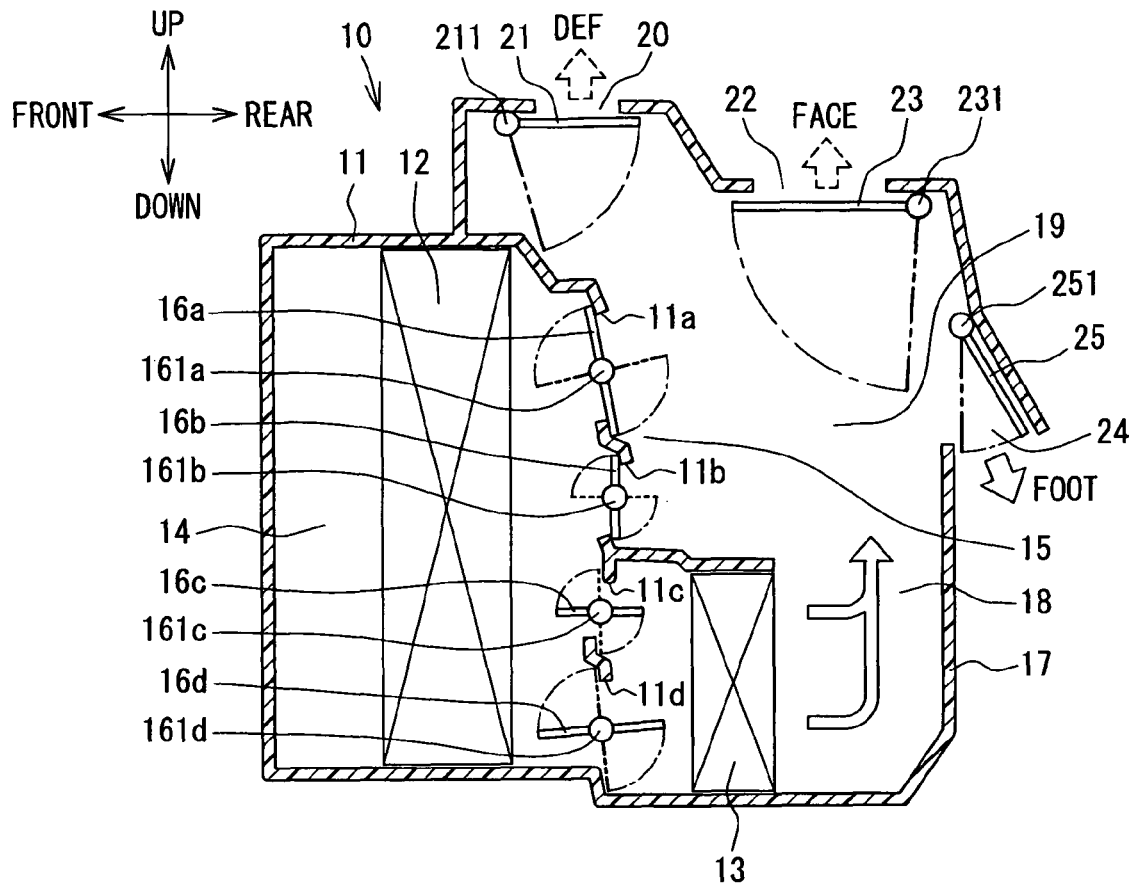
FIG. 1 is a schematic cross-sectional view of an air conditioning unit of an air conditioning apparatus, in a maximum heating condition, according to an embodiment of the present invention.

An embodiment of the present invention will now be described with reference to FIGS. 1 to 3. An air conditioning apparatus generally has a blower unit (not shown) and an air conditioning unit (hereinafter, referred to as the a/c unit) 10 shown in FIGS. 1 and 3. FIG. 1 shows the a/c unit 10 in a maximum heating condition, and FIG. 3 shows the a/c unit 10 in a maximum cooling condition.

The blower unit and the a/c unit 10 are disposed in a lower portion of an instrument panel of a vehicle. Further, the a/c unit 10 is located at a substantially middle position with respect to a vehicle right and left direction. The blower unit is offset from the a/c unit 10 toward a front passenger's seat side.

The blower unit generally includes an inside-outside air switching device and a blower. The inside/outside air switching device selectively suctions an inside air inside of the passenger compartment and an outside air outside of the passenger compartment. The blower draws the air from the inside/outside air switching device and blows the air into the a/c unit 10. For example, the blower includes a centrifugal fan, such as a sirocco fan, and an electric motor for driving the centrifugal fan.

The a/c unit 10 is disposed downstream of the blower unit with respect to an air flow path of the air conditioning apparatus. That is, the e/c unit 10 forms an air passage through which air to be introduced into the passenger compartment flows. The a/c unit 10 generally includes an air conditioning case 11, a refrigerant evaporator 12 as a heat exchanger for cooling air and a heater core 13 as a heat exchanger for heating air. The evaporator 12 and the heater core 13 are housed in the case 11.

For example, the case 11 is made of a resin, such as polypropylene, having some elasticity and sufficient strength. The case 11 is a separation-type case that is separable in the vehicle right and left direction. In other words, the case 11 is constructed by coupling a right case member and a left case member to each other in the vehicle right and left direction. Thus, the case 11 has a coupling line, that is, a separation line in a substantially up and down direction.

FIG. 1 shows the cross-section of the a/c unit 10 when taken along the coupling line of the case 11. The right and left case members are coupled to each other after component parts such as the evaporator 12, the heater core 13 and doors are assembled to predetermined positions. The right and left case members are coupled to each other through fastening devices such as metal clips, screws and the like, for example.

The a/c unit 10 is mounted at a front part of the passenger compartment in a position shown by up and down arrow and front and rear arrow in FIG. 1. In FIG. 1, a direction perpendicular to a paper surface corresponds to the vehicle right and left direction.

The case 11 has an air inlet port 14 at its front-most part. The air inlet port 14 is open on a side wall of the case 11, the side wall facing the blower unit. The air inlet port 14 is coupled to an air outlet port of the blower unit.

In the present embodiment, the a/c unit 10 is exemplarily adapted to a right-hand-drive car. In this case, the blower unit is located on a left side of the a/c unit 10. The air inlet port 14 is open on a left side wall of the case 11.

In the case 11, the evaporator 12 is arranged immediately downstream of the air inlet port 14. The evaporator 12 has a thickness with respect to a vehicle front and rear direction. The evaporator 12 is arranged to extend in the up and down direction and the vehicle right and left direction. In other words, the evaporator 12 is arranged across the air passage in the case 11. Thus, the air introduced in the case 11 from the air inlet port 14 fully passes through the evaporator 12 in a vehicle rearward direction.

The evaporator 12 is, for example, a general lamination-type heat exchanger in which flat tubes and corrugated fins are alternately arranged and brazed with each other. Each of the flat tubes is, for example, formed by joining a pair of metallic thin plates such as aluminum plates. The evaporator 12 constitutes a refrigerant cycle system with other devices. The evaporator 12 performs heat exchange between a refrigerant flowing inside of the evaporator 12 and the air, thereby cooling the air.

The heater core 13 is arranged downstream of the evaporator 12, such as, on a rear side of the evaporator 12. The heater core 13 is spaced from the evaporator 12 by a predetermined distance. A heat medium having high temperature, such as an engine coolant, flows inside of the heater core 13. The heater core 13 heats a cool air generated by the evaporator 12 by using heat of the heat medium.

The heater core 13 is, for example, a general lamination-type heat exchanger in which flat tubes and corrugated fins are alternately arranged and brazed with each other. Each of the flat tubes is, for example, formed by welding metallic plates, such as aluminum plates.

The case 11 forms a bypass passage (cool air passage) 15 above the heater core 13. The bypass passage 15 allows the cool air generated by the evaporator 12 to flow while bypassing the heater core 13. The a/c unit 10 further has a cool-side door device and a heating-side door device as air volume control devices for controlling the volume of the cool air passing through a heating air passage 18 to be heated by the heater core 13 and the volume of the cool air passing through the bypass passage 15. The cool-side door device and the heating-side door device are disposed between the evaporator 12 and the heater core 13.

Specifically, the cool-side door device includes multiple cool-side air mix doors, such as a first cool-side door 16a and a second cool-side door 16b. Likewise, the heating-side door device includes multiple heating-side air mix doors, such as a first heating-side door 16c and a second heating-side door 16d. The first and second cool-side doors 16a, 16b are configured to open and close the bypass passage 15. The first and second heating-side doors 16c, 16d are configured to open and close the heating air passage 18.

The air mix doors 16a, 16b, 16c, 16d are, for example, plate doors. The air mix doors 16a, 16b, 16c, 16d have door bodies and rotation shafts 161a, 161b, 161c, 161d, respectively. The door bodies are integrated with the rotation shafts 161a, 161b, 161c, 161d. The rotation shafts 161a, 161b, 161c, 161d are horizontally oriented. Thus, the air mix doors 16a, 16b, 16c, 16d are rotatable in the substantially up and down direction.

For example, the door bodies and the rotation shafts 161a, 161b, 161c, 161d are integrally formed with each other, of a resin. Each of the air mix doors 16a, 16b, 16c, 16d has an elastic sealing lip along a peripheral edge of the door body. The elastic sealing lip is made of elastomer, for example.

The case 11 forms two cool-side openings 11a, 11b that allows communication between a space downstream of the evaporator 12 and the bypass passage 15. The first cool-side door 16a is disposed to open and close the first cool-side opening 11a. The second cool-side door 16b is disposed to open and close the second cool-side opening 11b. The case 11 further forms two heating-side openings 11c, 11d that allow communication between the space downstream of the evaporator 12 and the heating air passage 18. The first heating-side door 16c is disposed to open and close the first heating-side opening 11c. The second heating-side door 16d is disposed to open and close the second heating-side opening 11d.

The case 11 and the first and second cool-side doors 16a, 16b are configured such that an opening area provided by one of the first cool-side door 16a and the second cool-side door 16b is smaller than an opening area provided by the other of the first cool-side door 16a and the second cool-side door 16b. Likewise, the case 11 and the first and second heating-side doors 16c, 16d are configured such that an opening area provided by one of the first heating-side door 16c and the second heating-side door 16d is smaller than the other of the first heating-side door 16c and the second heating-side door 16d. Here, the opening area is defined by an area of opening provided between each door 16a, 16b, 16c, 16d and the case 11 when the door is in its fully open position.

Further, one of the first and second cool-side doors 16a, 16b, which provides the smaller opening area than the other, is located closer to the heating air passage 18 than the other.

Likewise, one of the first and second heating-side doors 16c, 16d, which provides the smaller opening area than the other, is located closer to the bypass passage 15 than the other.

For example, the second cool-side door 16b, which provides the smaller opening area than that provided by the first cool-side door 16a, is located closer to the heating air passage 18 than the first cool-side door 16a. The first heating-side door 16c, which provides the smaller opening area than that provided by the second heating-side door 16d, is located closer to the bypass passage 15 than the second heating-side door 16d.

In the example shown in FIGS. 1 and 3, the second cool-side opening 11b is smaller than the first cool-side opening 11a and is located closer to the heating air passage 18 than the first cool-side opening 11a. The first heating-side opening 11c is smaller than the second heating-side opening 11d and is located closer to the bypass passage 15 than the second heating-side opening 11d. Also, the second cool-side door 16b is smaller than the first cool-side door 16a, and the first heating-side door 16c is smaller than the second heating-side door 16d.

The rotation shafts 161a, 161b, 161c, 161d are rotatably supported by the case 11, and a first end of each of the rotation shafts 161a, 161b, 161c, 161d projects to an outside of the case 11. The first ends of the rotation shafts 161a, 161b, 161c, 161d are connected to an operation device through a link mechanism (not shown). Thus, the rotational positions, that is, opening degrees of the air mix doors 16a, 16b, 16c, 16d are controlled by the operation device. The operation device is, for example, an actuator device having a servomotor or the like, or a manual operation device.

Figure 2:
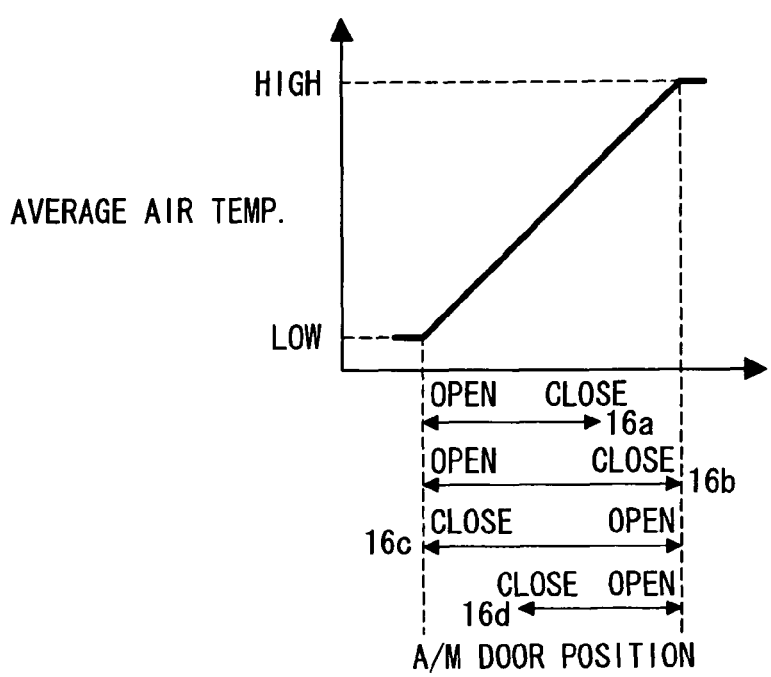
FIG. 2 is a graph showing a relationship between positions of air mix doors and an average temperature of air blown from air outlets of a passenger compartment according to the embodiment.
Figure 3:
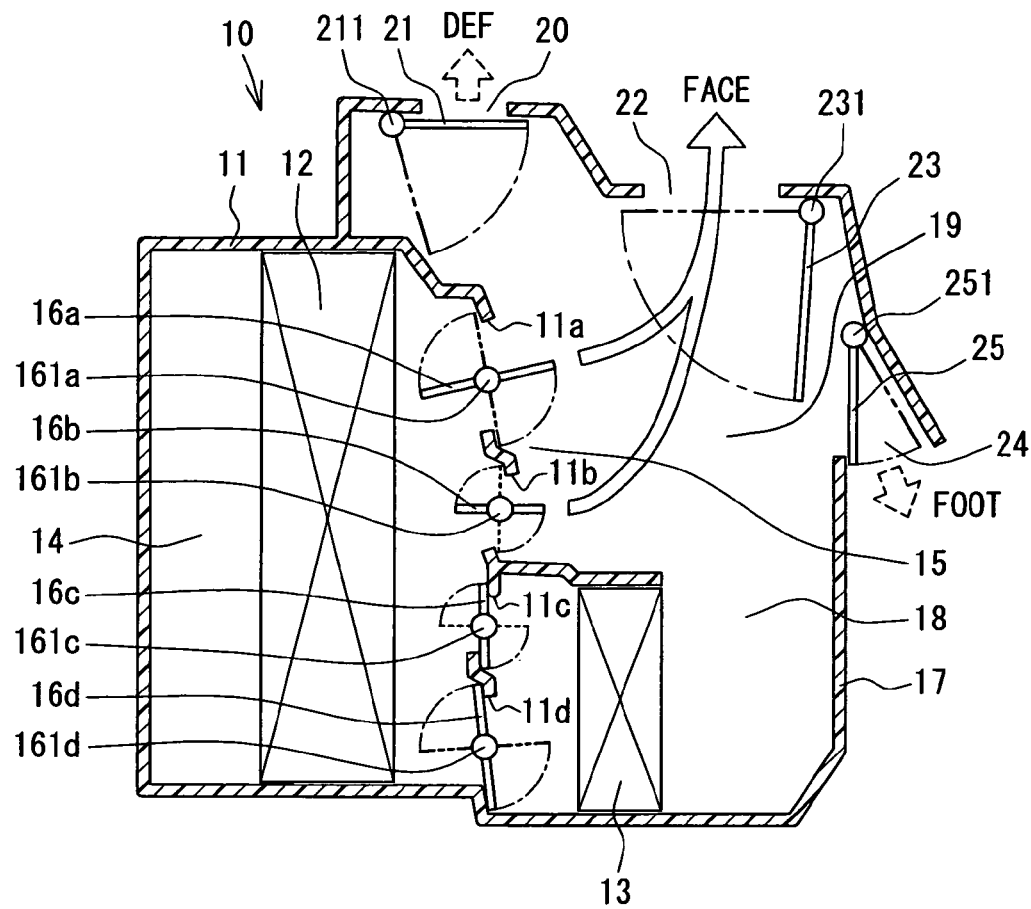
FIG. 3 is a schematic cross-sectional view of the air conditioning unit, in a maximum cooling condition, according to the embodiment.

FIG. 2 is a graph showing a relationship between the opening degree of each air mix door 16a, 16b, 16c, 16d and an average temperature of airs blown from respective outlets that are provided for introducing the air conditioned by the a/c unit 10 into the passenger compartment. The air mix doors 16a, 16b, 16c, 16d are configured to control the ratio of the volume of the cool air passing through the bypass passage 15 to the volume of the heating air passing through the heating air passage 18, thereby to control the temperature of air to be introduced into the passenger compartment. Namely, the air mix doors 16a, 16b, 16c, 16d serve as a temperature control device for controlling the temperature of air introduced in the passenger compartment. As such, opening/closing operations of the first cool-side doors 16a, 16b are opposite to opening/closing operations of the first and second heating-side doors 16c, 16d.

In the maximum heating condition for increasing the air temperature, as shown in FIG. 1, the cool-side doors 16a, 16b are in a fully closed position such that the bypass passage 15 is fully closed, and the heating-side doors 16c, 16d are in a fully open position such that the heating air passage 18 is fully open. In contrast, in the maximum cooling condition for reducing the air temperature, as shown in FIG. 3, the cool-side doors 16a, 16b are in a fully open position such that the bypass passage 15 is fully open and the heating-side doors 16c, 16d are in a fully closed position such that the heating air passage 18 is fully closed.

In the present embodiment, in opening the bypass passage 15 from the fully closed condition, the first and second cool-side doors 16a, 16b are operated to begin to open successively. Likewise, in opening the heating air passage 18 from the fully closed condition, the first and second heating-side doors 16c, 16d are operated to begin to open successively. For example, in opening the first and second cool-side doors 16a, 16b successively, the second cool-side door 16b, which provides the smaller opening area than the first cool-side door 16a and is located closer to the heating air passage 18 than the first cool-side door 16a, begins to open before the first cool-side door 16a begins to open. Also, in opening the first and second heating-side doors 16c, 16d successively, the first heating-side door 16c, which provides the smaller opening area than the second heating-side door 16d and is located closer to the bypass passage 15 than the second heating-side door 16d, begins to open before the second heating-side door 16d begins to open.

To shift to a condition for reducing the air temperature from the maximum heating condition, the second cool-side door 16b begins to open before the first cool-side door 16a begins to open, while the heating-side doors 16c, 16d begin to close. Specifically, when the second cool-side door 16b is opened by a predetermined degree, the first cool-side door 16a begins to open.

On the other hand, to shift to a condition for increasing the air temperature from the maximum cooling condition, the first heating-side door 16c begins to open before the second heating-side door 16d begins to open, while the cool-side doors 16a, 16b begin to close. Specifically, when the first heating-side door 16c is opened by a predetermined degree, the second heating-side door 16d begins to open.

The case 11 has a wall 17 downstream of the heater core 13, such as on the rear side of the heater core 13. The wall 17 is spaced from the heater core 13 by a predetermined distance. The wall 17 generally extends in the up and down direction. The wall 17 is integrally formed into the case 11. A part of the heating air passage 18 is provided by the space defined between the heater core 13 and the wall 17. The heated air flows upward from a position immediately downstream of the heater core 13.

The heating air passage 18 merges with the bypass passage 15 in a rear upper portion of the heater core 13. In other words, the case 11 forms an air mixing space 19 downstream of the heating air passage 18, such as above the heating air passage 18, for allowing the heated air to be mixed with the cool air passing through the bypass passage 15. Thus, the temperature of air to be introduced into the passenger compartment is controlled in accordance with a mixing ratio of the heated air to the cool air in the air mixing space 19. Hereinafter, the air is referred to as a conditioned air.

The a/c unit 10 has an air-blow mode switching section downstream of the air mixing space 19 and in the case 11. The air-blow mode switching section includes a defroster opening 20, a face opening 22 and a foot opening 24 and air-blow mode doors such as a defroster door 21, a face door 23 and a foot door 25, and the like.

The defroster opening 20 is formed on a front portion of an upper wall part of the case 11. The heated air passing through the heating air passage 18 or the conditioned air from the air mixing space 19 is mainly introduced to the defroster opening 20. The defroster opening 20 is in communication with a defroster outlet of the passenger compartment through a defroster duct (not shown). Thus, the air passing through the defroster opening 20 is blown toward an inner surface of a windshield of the vehicle from the defroster outlet.

The defroster door 21 is provided to open and close the defroster opening 20. For example, the defroster door 21 is a plate door. The defroster door 21 has a door body and a rotation shaft 211 that is arranged in a horizontal direction at a position adjacent to the upper wall part of the case 11. The door body is rotatable about the rotation shaft 211 at the position adjacent to the upper wall part of the case 11.

The door body and the rotation shaft 211 are made of a resin and are integrally formed with each other. Further, the door body has an elastic sealing lip along its peripheral edge.

The elastic sealing lip is made of elastomer, for example. The rotation shaft 211 is located at an upstream portion of the perimeter of the defroster opening 20 with respect to the cool air flow from the bypass passage 15 toward the air mixing space 19. Thus, the door body of the defroster door 21 extends from the rotation shaft 211 toward a downstream side with respect to the cool air flow. In the example shown in FIG. 1, the rotation shaft 211 is located adjacent to a front edge of the defroster opening 21.

The face opening 22 is formed on a rear side of the defroster opening 21, on the upper wall part of the case 11. The cool air passing through the bypass passage 15 or the conditioned air from the air mixing space 19 is mainly introduced to the face opening 22. The face opening 22 is in communication with a face outlet of the passenger compartment through a face duct (not shown). Thus, the air passing through the face opening 22 is blown toward an upper body of a passenger, such as a head and chest portion of the passenger in the compartment, from the face outlet.

The face door 23 is provided to open and close the face opening 22. For example, the face door 23 is a plate door having a door body and a rotation shaft 231. The rotation shaft 231 is arranged in the horizontal direction at a position adjacent to the upper wall part of the case 11. The door body is rotatable about the rotation shaft 231 at the position adjacent to the upper wall part of the case 11.

The rotation shaft 231 and the door body are made of resin and are integrally formed with each other. The door body has an elastic sealing lip on its peripheral edge. The elastic sealing lip is made of elastomer, for example.

The foot opening 24 is formed at a position lower than the face opening 22. The heated air passing through the heating air passage 18 or the conditioned air from the air mixing space 19 is mainly introduced to the foot opening 24. The foot opening 24 is in communication with a foot outlet of the passenger compartment through a foot duct (not shown). The air passing through the foot opening 24 is blown toward a foot area of the passenger in the passenger compartment from the foot outlet.

The foot door 25 is provided to open and close the foot opening 24. For example, the foot door 25 is a plate door having a door body and a rotation shaft 251. The rotation shaft 251 is arranged in the horizontal direction at a position adjacent to a rear wall of the case 11. The door body is rotatable about the rotation shaft 251 at the position adjacent to the rear wall of the case 11.

The door body and the rotation shaft 251 of the foot door 25 are made of a resin and are integrally formed with each other. The door body has an elastic sealing lip along its peripheral edge. The elastic sealing lip is made of elastomer, for example. The sealing structure of the defroster door 21, the face door 23 and the foot door 25 can be provided by a packing member made of a urethane resin or the like, in place of the sealing lip made of the elastomer.

The defroster door 21, the face door 23 and the foot door 25 are coupled to an operation device through a linking mechanism. The operation device is, for example, an actuator device including a servomotor or the like, or a manual operation device. Air-blow modes are controlled by controlling the rotational positions of the doors 21, 23, 25 through the operation device and the linking mechanism.

The air-blowing modes are, for example, a face mode, a bi-level mode, a foot mode, a foot/defroster mode, a defroster mode and the like. FIG. 1 shows a heating condition for performing a heating operation in the foot mode. FIG. 3 shows a cooling condition for performing a cooling operation in the face mode. Here, description of a structure relating to a control operation of the a/c unit 10 and an operation of the a/c unit 10 will be omitted.

Figure 4:
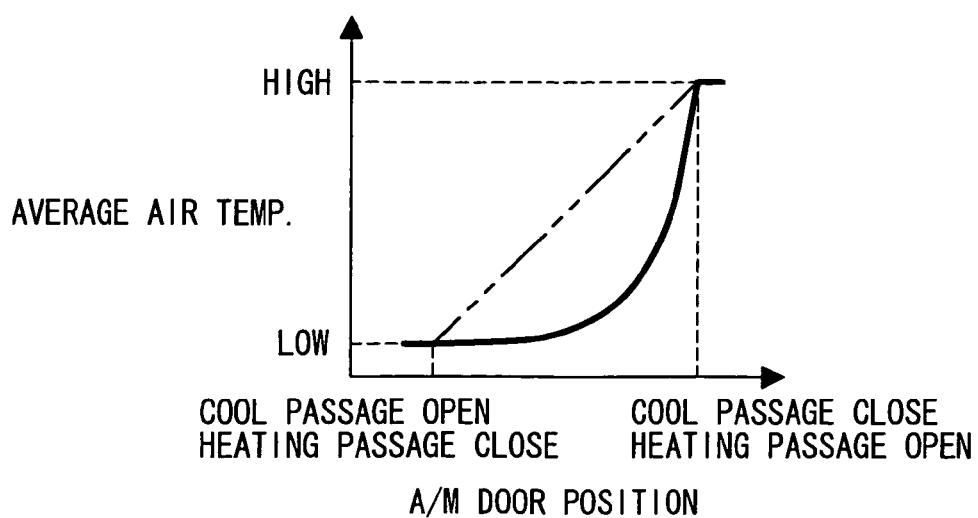
FIG. 4 is a graph showing a relationship between a position of an air mix door and an average temperature of air blown from air outlets of a passenger compartment according to an air conditioning apparatus having the single air mix door as a comparative example.

Next, features and effects of the present embodiment will be described, while comparing with an air conditioning unit having a single air mix door as a comparative example. FIG. 4 shows a relationship between a position of the air mix door and an average air temperature blown from the outlets in the air conditioning unit of the comparative example.

In the a/c unit, passage resistance of the bypass passage is lower than that of the heating air passage since the heater core is not provided in the bypass passage. Therefore, in the comparative example, when the air mix door is slightly opened from a maximum heating position at which the air mix door fully closes the bypass passage, an amount of the cool air tends to flow in the bypass passage. As a result, the temperature of air blown into the passenger compartment is rapidly reduced, as shown in FIG. 4. It is difficult to control the average temperature.

In the present embodiment, on the other hand, the air conditioning unit 10 has multiple air mix doors such as the first and second cool-side doors 16a, 16b for opening and closing the bypass passage 15 and the first and second heating-side doors 16c, 16d for opening and closing the heating air passage 18. When the first and second cool-side doors 16a, 16b are opened from the fully closed position, the first and second cool-side doors 16a, 16b begin to open successively. Likewise, when the first and second heating-side doors 16c, 16d are opened from the fully closed position, the first and second heating-side doors 16c, 16d begin to open successively.

When the operation condition is to be shifted from the maximum heating condition toward a heating condition, that is, when the bypass passage 15 is gradually opened from the fully closed condition, the first and second cool-side doors 16a, 16b begin to open successively. Therefore, it is less likely that an amount of the cool air will flow into the bypass passage 15 and the temperature of air to be blown into the passenger compartment will rapidly drop.

Further, when the operation condition is to be shifted from the maximum cooling condition toward a cooling condition, that is, when the heating air passage 18 is gradually opened from the fully closed condition, the first and second heating-side doors 16c, 16d begin to open successively. Therefore, it is less likely that an amount of the cool air will be introduced to the heater core 13 and the temperature of air to be blown into the passenger compartment will rapidly increase.

Accordingly, the air temperature can be controlled smoothly. As shown in FIG. 2, the air temperature with respect to the opening degrees of the doors 16a, 16b, 16c, 16d have a generally linear characteristic.

In the case where the first and second cool-side doors 16a, 16b are configured to provide the different opening areas, one of the first and second cool-side doors 16a, 16b, which provides the smaller opening area than the other, begins to open before the other begins to open. Accordingly, the amount of cool air introduced in the bypass passage 15 is controlled, at the beginning of opening the bypass passage 15. Therefore, it is less likely that the air temperature will rapidly drop.

Likewise, in the case where the first and second heating-side doors 16c, 16d are configured to provide the different opening areas, one of the first and second heating-side doors 16c, 16d, which provides the smaller opening area than the other, begins to open before the other begins to open. Accordingly, the amount of cool air introduced in the heating air passage 18 is controlled, at the beginning of opening the heating air passage 18. Therefore, it is less likely that the air temperature will be rapidly increase.

Further, the second cool-side door 16*b* providing the smaller opening area than that of the first cool-side door 16*a* is disposed closer to the heating air passage 18 than the first cool-side door 16*a*. The second cool-side door 16*b* begins to open before the first cool-side door 16*a* begins to open, when the bypass passage 15 is opened from the fully closed condition. In this case, the cool air can be gradually merged with the heated air of the heating air passage 18.

Likewise, the first heating-side door 16*c* providing the smaller opening area than that of the second heating-side door 16*d* is disposed closer to the bypass passage 15 than the second heating-side door 16*d*. The first heating-side door 16*c* begins to open before the second heating-side door 16*d* begins to open, when the heating air passage 18 is opened from the fully closed condition. In this case, the heating air can be gradually merged with the cool air of the bypass passage 15.

Accordingly, the air temperature can be varied while effectively mixing the cool air and the heated air. In particular, when the bypass passage 15 is slightly opened from the fully closed condition of the maximum heating condition, it is less likely that the large amount of the cool air will be introduced in the bypass passage 15 and the air temperature will rapidly drop.

Other Embodiments

Additional advantages and modifications will readily occur to those skilled in the art. The invention in its broader term is therefore not limited to the specific details, representative apparatus, and illustrative examples shown and described. For example, the above embodiment will be modified as follows.

In the above embodiment, the cool-side openings 11*a*, 11*b* are separately formed, and the heating-side openings 11*c*, 11*d* are separately formed. As another example, the cool-side openings 11*a*, 11*b* can be integrated as a single opening, and the cool-side doors 16*a*, 16*b*, which have different sizes, can be disposed to open and close the single opening. Likewise, the openings 11*c*, 11*d* can be integrated as a single opening, and the heating-side doors 16*c*, 16*d*, which have different sizes, can be disposed to open and close the single opening.

In the above embodiment, the a/c unit 10 has the two doors for each of the bypass passage 15 and the heating air passage 18. However, the number of doors can be modified. For example, the a/c unit 10 has a single door for one of the bypass passage 15 and the heating air passage 18 and multiple doors (e.g., two, three, etc.) for the other of the bypass passage 15 and the heating air passage 18. As another example, the a/c unit 10 has three or more than three doors for each of the bypass passage 15 and the heating air passage 18.

In the above embodiment, each of the doors 16*a*, 16*b*, 16*c*, 16*d* is the butterfly door having the rotation shaft 161*a*, 161*b*, 161*c*, 161*d* at the middle of the door body. However, the type of the doors 16*a*, 16*b*, 16*c*, 16*d* is not limited to the butterfly door. For example, the doors 16*a*, 16*b*, 16*c*, 16*d* may be one of a one-side holding door in which a rotation shaft is provided at one end of a door body, a rotary door in which a rotation shaft is spaced from a door body, a slide door that is moved in a sliding manner and the like. Further, the door type can be varied between the multiple doors 16*a*, 16*b*, 16*c*, 16*d*.

The doors 16*a*, 16*b*, 16*c*, 16*d* can be directly assembled to the case 11. As another example, the doors 16*a*, 16*b*, 16*c*, 16*d* are integrated into a unit, such as a sub-assembly, and the unit can be assembled to the case 11. Further, the above discussed door structure can be employed to a right-left independent control air conditioning unit.

What is claimed is:

1. An air conditioning apparatus for a vehicle, comprising:
a case;
an evaporator disposed in the case for generating a cool air;
a cool air passage provided in the case downstream of the evaporator;
a heating air passage provided in the case downstream of the evaporator;
an air mixing space provided in the case downstream of the cool air passage and the heating air passage;
a heater core disposed in the heating air passage for heating at least part of the cool air;
a cool-side door device disposed upstream of the cool air passage, the cool-side door device configured to control a volume of the cool air flowing in the cool air passage; and
a heating-side door device disposed upstream of the heating air passage, the heating-side door device configured to control a volume of the cool air flowing in the heating air passage, wherein
at least one of the cool-side door device and the heating-side door device includes a plurality of doors, and
the plurality of doors are configured to begin to open successively when the plurality of doors are opened from a fully closed state,
the plurality of doors of the cool-side door device includes at least a first cool-side door and a second cool-side door,
the first cool-side door and the second cool-side door are configured such that an opening area provided by the first cool-side door is smaller than an opening area provided by the second cool-side door, and
the first cool-side door is located closer to the heating air passage than the second cool-side door.

2. The air conditioning apparatus according to claim 1, wherein
the first cool-side door is configured to begin to open before the second cool-side door begins to open, when the first and second cool-side doors are opened from a fully closed condition.

3. The air conditioning apparatus according to claim 1, wherein
the case has a first cool-side opening and a second cool-side opening that are in communication with the cool air passage, the first cool-side opening being smaller than the second cool-side opening,
the first cool-side door is disposed to open and close the first cool-side opening the second 'cool-side door is disposed to open and close the second cool-side opening.

4. An air conditioning apparatus for a vehicle, comprising:
a case;
an evaporator disposed in the case for generating a cool air;
a cool air passage provided in the case downstream of the evaporator;
a heating air passage provided in the case downstream of the evaporator;
an air mixing space provided in the case downstream of the cool air passage and the heating air passage;
a heater core disposed in the heating air passage for heating at least part of the cool air;
a cool-side door device disposed upstream of the cool air passage, the cool-side door device configured to control a volume of the cool air flowing in the cool air passage; and a heating-side door device disposed upstream of the heating air passage, the heating-side door device configured to control a volume of the cool air flowing in the heating air passage, wherein at least one of the cool-side door device and the heating-side door device includes a plurality of doors, and the plurality of doors are configured to begin to open successively when the plurality of doors are opened from a fully closed state, the plurality of doors of the heating-side door device includes at least a first heating-side door and a second heating-side door, the first heating-side door and the second heating-side door are configured such that an opening area provided by the first heating-side door is smaller than an opening area provided by the second heating-side door, and the first heating-side door is located closer to the cool air passage than the second heating-side door.

5. The air conditioning apparatus according to claim 4, wherein the first heating-side door is configured to begin to open before the second heating-side door begins to open, when the first and second heating-side doors are opened from a fully closed condition.

6. The air conditioning apparatus according to claim 4, wherein the case has a first heating-side opening and a second heating-side opening that are in communication with the heating air passage, the first heating-side opening being smaller than the second heating-side opening, the first heating-side door is disposed to open and close the first heating-side opening and the second heating-side door is disposed to open and close the second heating-side opening.

* * * * *